(No Model.)
A. SYVERSEN.
DEVICE FOR REGULATING ROTARY MOTION.
No. 250,404. Patented Dec. 6, 1881.
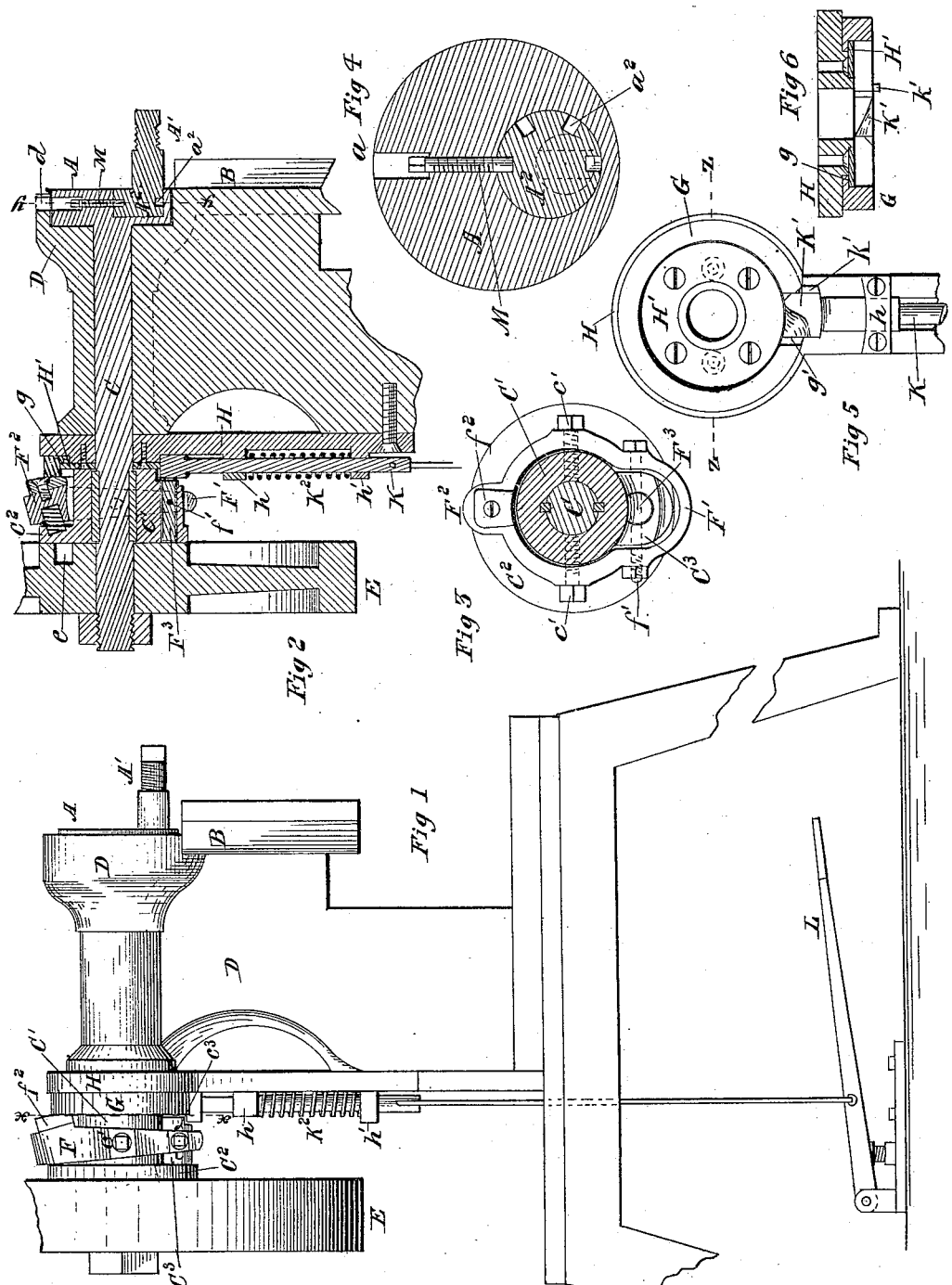
Witnesses
W. C. Coolies
Jno. C. MacGregor
Inventor
Andreas Syversen
By Coburn & Thacher
Attorneys

UNITED STATES PATENT OFFICE.

ANDREAS SYVERSEN, OF CHICAGO, ILLINOIS.

DEVICE FOR REGULATING ROTARY MOTION.

SPECIFICATION forming part of Letters Patent No. 250,404, dated December 6, 1881.

Application filed August 8, 1881. (No model.)

*To all whom it may concern:*

Be it known that I, ANDREAS SYVERSEN, a citizen of the United States, residing in the city of Chicago, in the county of Cook, in the State of Illinois, have invented certain new and useful Improvements in Devices for Regulating Rotary Motion, which are fully set forth in the following specification, reference being had to the accompanying drawings, in which—

Figure 1 is a side elevation of part of a stamping-machine provided with my improvements. Fig. 2 is a longitudinal vertical section of the same, the lower part being broken away. Fig. 3 is a detailed and enlarged section on the line $x\ x$ in Fig. 1, the point of view being on the right of the section plane. Fig. 4 is a detailed and enlarged section on the line $y\ y$ in Fig. 2, the point of view being to the left of the section plane. Fig. 5 is a detailed and enlarged front elevation of the notched ring which forms part of the device for connecting and disconnecting the machinery with the driving-power, together with its support and with the disconnecting-latch interlocked. Fig. 6 is a detailed and enlarged section on the line $z\ z$ in Fig. 5, the point of view being above the section plane.

The same letters denote the same parts in all the figures.

My invention relates to machinery operated by a revolving shaft which derives its motion from a wheel connected with the driving power; and it consists in the devices and combinations of devices for connecting and disconnecting the shaft with the wheel and arresting the motion of the former, and for increasing and diminishing the sweep of the crank or analogous appliance operated by the shaft, which will be fully described hereinafter and definitely pointed out in the claims, the object being to accomplish these results by means more simple, convenient, and inexpensive, though not less efficacious, than those now in use.

In the drawings, A represents the crank-wheel, with its crank-shaft A', which operates the die or other tool. This crank-wheel is rigidly set on a main shaft, C, which has a bearing in the supporting-frame D. The band-wheel E, connected with the driving-machinery, is also set on the shaft C, so as to turn freely on it. Between this wheel and the supporting-frame D the shaft has a surrounding shell, C', keyed to it. A circular flange, $C^2$, of this shell is in contact with the band-wheel. On the face opposite to this flange the wheel has a socket or mortise, $e$. The shell C' affords an enlarged bearing for the clutch F, which is a collar of generally circular form surrounding the shell and pivotally affixed to it by the two bolts $c'$, which are both in the same diametric line. The clutch is so much larger than the shell as to be capable of a slight vibratory motion on it and about the bolts $c'$. At the ends of that diameter which is at right angles to the bolts $c'$ and in the direction of that diameter the clutch has two enlargements, F' and $F^2$. The enlargement F', by means of a bolt, $f'$, passing through it from side to side and rigidly set in it, supports midway between its two sides a pin, $F^3$, nearly parallel to the axis of the shaft C. This pin is equidistant from the axis with the mortise $e$ of the band-wheel, and is of suitable dimensions to fit in it when the vibration of the clutch brings the enlargement F' nearest to the wheel. The shell C' has also an enlargement, $C^3$, corresponding to the enlargement F', and perforated, as is also the flange $C^2$, to allow the pin $F^3$ to pass through it into the mortise $e$. The enlargement $C^3$ has also a slot, $c^3$, cut in it, through which the bolt $f'$ moves back and forth when the clutch vibrates. The shell C' is obviously not an essential part of the device, since the collar F might have its bearing immediately on the shaft; but it is desirable to have a larger bearing-surface than a shaft of ordinary size would afford.

Between the clutch F and the crank-wheel, and so near to the former as to be in contact with it when that part of the clutch adjoining the enlargement $F^2$ is farthest from the band-wheel, is a ring, G, nearly equal in diameter to the clutch F, and surrounding the shell C', but not in contact with it. On the face nearest the crank-wheel it has a flange, $g$, extending toward its center. This flange rests on a shoulder cut in the outer edge of the plate H, which plate is attached by any convenient means to the supporting-frame D, and is parallel with the ring. This plate is circular in its upper part, where it is opposite to the ring, which it somewhat exceeds in diameter. It has also a central circular aperture, through which the shaft passes. Below the ring it extends downward in the form of a narrow rectangle. Another annular plate, H', somewhat larger than the innermost circumference of the flange $g$ and so small at to fit easily within the unflanged part of the ring, is screwed to the outer face of H, so as to form, with it, a circular groove, in which the ring G rests by means of its flange, the breadth of the shoulder on H being sufficient to admit of the ring turning freely in the groove. The ring G is cut away in one part of its circumference, so as to form a notch, $g'$, just large enough to receive a lug, $f^2$, which projects from the opposite face of the enlargement $F^2$ of the clutch F. This enlargement $F^2$ is a solid plate or block, recessed on the face adjoining the flange $C^2$ of the shell, which is also correspondingly recessed. A spring, J, set in these recesses, tends by its elasticity to push the enlargement against the ring G, and thus to force the lug $f^2$ into the notch $g'$ when the two are opposite each other. Obviously the other enlargement, F', will by the same motion be forced toward the band-wheel, so as to bring the pin $F^3$ into the mortise $e$ whenever the two are opposite each other.

A perpendicular rod, K, has an upward and downward play in two collars, $h$ and $h'$, which are set on the face of the rectangular part of the plate H below the ring. A stop or latch, K', on the upper end of this rod is adapted, like the lug $f^2$, to fit into the notch $g'$, and a coiled spring, $K^2$, attached at one end to the rod and confined between the two collars, tends by its elasticity to hold the rod up, so that the latch K' will engage in the notch $g'$ whenever the ring is turned so as to bring the notched part of its circumference lowest. The lower end of the rod K is connected, either directly or, as shown in the drawings, by means of a cord, wire, or the like, with a treadle, L, so that by the pressure of the operator's foot the latch K' can be drawn and kept out of the notch $g'$. The outer and upper corner of the latch K', which is opposite to the direction in which the band-wheel turns, is cut off in a curve, so as to engage with the lug $f^2$ when it encounters it in the notch $g'$ and gradually lift it out, the spring $K^2$ forcing the latch itself into the place thus vacated. A flange, $k'$, projecting in front on the other side of the latch serves as a stop to prevent the clutch, and consequently the shaft C, from turning any farther when the lug $f^2$ has been forced out of the notch $g'$. It also prevents the shaft from turning more than a single revolution at most in the opposite direction when disconnected from the driving-wheel, and thus obviates a class of accidents which are often quite inconvenient. The drawings are made on the supposition that the band-wheel will turn with its lower half to the right; consequently the curved bevel of the latch K' is on its left side and the projecting flange $k'$ on its right.

To set the shaft in motion, the ring G being first set with its notch $g'$ lowermost, the main shaft C is turned by the application of a monkey-wrench, or otherwise, until the enlargement $F^2$, carrying the lug $f^2$, is opposite the notch $g'$. The latch K' being drawn and held out of the notch by depressing the treadle, the spring J will force the lug $f^2$ into the notch, and consequently the pin $F^3$ into the mortise $e$, as soon as the revolution of the band-wheel brings the latter opposite the pin. The band-wheel and clutch being thus locked together, and the clutch being incapable of any rotary motion independently of the shaft C, the latter will necessarily revolve and carry with it the crank-wheel. The band-wheel will thus continue to communicate its motion to the tool so long as the latch K' is held down by depressing the treadle. To disconnect the shaft C from the band-wheel, and thus arrest the operation of the tool, the operator simply takes his foot from the treadle. The spring $K^2$ immediately forces the latch K' up against the ring G, and as soon as the ring (which necessarily revolves with the clutch with which it is interlocked) comes into that position where its notch (now engaged with the lug $f^2$) is undermost the bevel on the left side of the latch will encounter the lug $f^2$, lift it out of the notch, and take its place there. The end of the clutch which carries the lug $f^2$ being thus forced back toward the band-wheel, the other end, which carries the pin $F^3$, is necessarily drawn forward away from the band-wheel, so that the pin comes out of the mortise in the wheel, which now turns independently of the clutch and shaft, and thus communicates no motion to the latter. Any motion of the shaft resulting from acquired momentum is at the same time immediately arrested by the flange $k'$, against which the enlargement $F^2$ strikes.

I thus provide a simple, convenient, and immediately efficacious means of arresting the revolution of a shaft, and am thus enabled to dispense with the customary cumbersome and expensive apparatus of counter-shaft and pulleys, for which, moreover, it is sometimes difficult to find room within reach of the operator's stand.

By the use of my device the die or other tool can obviously be adjusted or changed without stopping the driving machinery.

In the crank-wheel A, I cut at one side of the center a circular depression, in which I set a secondary crank-wheel, $A^2$, which carries at one side of its center the crank-shaft A'. In the periphery of this secondary wheel I cut a number of radial and cylindrical sockets, $a^2$. I also drill a radial hole, $a$, through the large crank-wheel A, so as to register with the several sockets, $a^2$, as the wheel $A^2$ is made to turn within A. This hole $a$ is cylindrical and threaded for the greater part of its length, but the part nearest the periphery of A is enlarged. A third radial hole, $d$, corresponding in cross-section to $a$, is drilled through that part of the supporting-frame in which the crank-wheel rests, so as to register with $a$ at a certain point in the rotation of the wheel A.

It is obvious that by turning the wheel $A^2$ within the wheel A the distance of the crank-shaft from the common center of the wheel A and the shaft C may be varied, and the reciprocating stroke communicated by the crank proportionately lengthened or shortened.

The apertures $d$ and $a$, being first made continuous with each other by turning the wheel A into the proper position, the wheel $A^2$ may then be turned within A until that socket $a^2$ which corresponds to the desired position of the crank-shaft is brought into registry with $d$ and $a$. A screw-bolt, M, of a length somewhat greater than the combined depth of the socket $a^2$ and the threaded part of $a$, is then let into the continuous socket formed by $d$, $a$, and $a^2$, and screwed into the threaded part of $a$, the enlarged cross-section of $d$ and the upper part of $a$ affording room for the operation of a wrench. The crank-shaft will thus be securely locked in the desired position. When it is desired to change this position for the purpose of lengthening or shortening the stroke, the bolt M is withdrawn, and, the wheel A remaining in the same position, the wheel $A^2$ is turned until another socket $a^2$ corresponding to the position in which it is desired to adjust the crank-shaft is brought into continuity with the apertures $d$ and $a$. The bolt M is then screwed into place, as before, thus locking the crank-shaft into its new position.

What I claim as my invention, and desire to secure by Letters Patent, is—

1. In combination with a rotary shaft, a driving-wheel loosely set thereon and mortised on its inner face, a notched ring surrounding the shaft and supported in a circular bearing independently of it, a collar pivotally affixed to the shaft by means of a bolt or bolts at right angles to its axis, and provided at one extremity of a diameter at right angles to the pivotal bolt with a projection facing the ring and arranged to engage with the notch thereof, and at the other extremity with a projection facing the driving-wheel and arranged to engage with the mortise therein, a latch supported below the center of the ring and beveled on the side opposite to the direction in which the shaft revolves, and mechanism, controlled by the operator, for forcing the latch upward into the notch and for withdrawing it from contact with the ring, substantially as and for the purpose described.

2. The rotary shaft C, driving-wheel E, loosely set thereon and provided with the mortise $e$, plate H, shaped as described, and attached to the supporting-frame opposite to the wheel E, ring G, surrounding the shaft, having a bearing in the circular periphery of the plate H and provided with the notch $g'$, collar F, pivoted on the shaft between the wheel E and ring G and provided with the projections $F^3$ and $f^2$, rod K on the plate H, latch K', provided with the projecting flange $k'$, and mechanism, controlled by the operator, for moving the rod upward and downward, all in combination, substantially as and for the purposes described.

3. A rotary shaft, a driving-wheel loosely mounted thereon, a ring, G, surrounding the shaft, supported in a circular bearing independently of it and provided with a notch, $g'$, a clutch pivoted on the shaft between the ring and the driving-wheel, and provided with diametrically-opposite projections, arranged to engage with the ring and the driving-wheel respectively, a beveled latch, adapted to engage with the notch, and mechanism for forcing the latch automatically into the notch and withdrawing it at the will of the operator, all in combination, substantially as and for the purposes described.

4. A rotary shaft, a driving-wheel turning independently of the shaft, the ring G, provided with the notch $g'$ and arranged about the shaft on an independent bearing, the beveled latch K', provided with the flange $k'$, mechanism for engaging and disengaging the latch with the notch, and a clutch pivoted on the shaft between the ring G and the driving-wheel, and provided with projections arranged to engage and disengage with the wheel and the ring simultaneously, all in combination, substantially as and for the purposes described.

5. The rotary shaft C, crank-wheel A, provided with the radial aperture $a$, secondary crank-wheel $A^2$, provided with the radial sockets $a^2$, and bolt M, all in combination, substantially as and for the purposes described.

ANDREAS SYVERSEN.

Witnesses:
JNO. C. MACGREGOR,
M. B. GAGE.